(12) United States Patent
Vendier et al.

(10) Patent No.: US 11,258,147 B2
(45) Date of Patent: Feb. 22, 2022

(54) ASSEMBLY COMPRISING A SLEEVE CONNECTING FIRST AND SECOND HOLLOW WAVEGUIDES, WHEREIN GROOVES FOR RECEIVING REVERSIBLE DEFORMABLE ELEMENTS THEREIN ARE LOCATED WAVEGUIDES AND SLEEVE

(71) Applicants: THALES, Courbevoie (FR); Bal Seal Engineering, LLC, Foothill Ranch, CA (US)

(72) Inventors: Olivier Vendier, Aureville (FR); Bertrand Brevart, Carbonne (FR); Gilbert Fouctiere, Toulouse (FR); Stéphane Forestier, Pechabou (FR); Didier Dupuy, Toulouse (FR); Brandon Grant, Irvine, CA (US)

(73) Assignees: THALES, Courbevoie (FR); BAL SEAL ENGINEERING, LLC, Foothill Ranch, CA (US)

(*) Notice: Subject to any disclaimer, the term of this patent is extended or adjusted under 35 U.S.C. 154(b) by 0 days.

(21) Appl. No.: 16/904,542

(22) Filed: Jun. 17, 2020

(65) Prior Publication Data
US 2020/0403288 A1 Dec. 24, 2020

(30) Foreign Application Priority Data
Jun. 20, 2019 (FR) ...................................... 1906651

(51) Int. Cl.
*H01P 1/04* (2006.01)
*B64G 1/10* (2006.01)
*B64G 1/66* (2006.01)
*H01P 3/12* (2006.01)
*H01P 5/02* (2006.01)

(52) U.S. Cl.
CPC ................ *H01P 1/042* (2013.01); *B64G 1/10* (2013.01); *B64G 1/66* (2013.01); *H01P 3/12* (2013.01); *H01P 5/02* (2013.01)

(58) Field of Classification Search
CPC ....................................................... H01P 1/042
USPC ......................................................... 333/254
See application file for complete search history.

(56) References Cited

U.S. PATENT DOCUMENTS

| 5,082,390 | A | 1/1992 | Balsells |
| 5,926,943 | A | 7/1999 | Kashy |
| 7,722,415 | B2 | 5/2010 | Changsrivong |
| 7,955,145 | B2 | 6/2011 | Chansrivong |
| 8,167,285 | B2 | 5/2012 | Balsells |
| 9,267,526 | B2 | 2/2016 | Balsells |

(Continued)

*Primary Examiner* — Benny T Lee
(74) *Attorney, Agent, or Firm* — BakerHostetler

(57) ABSTRACT

An assembly includes a first waveguide and a second waveguide extending longitudinally along a first axis, each having an end, each comprising a first annular groove, the two ends being contiguous along the first axis, and an assembly device for assembling the first waveguide and the second waveguide, wherein the assembly device comprises a sleeve surrounding the ends of the first and second waveguides and having an inner wall comprising two first annular grooves facing the first annular grooves of the first and second waveguides, two reversibly deformable waveguides, each being positioned in a first annular groove of the sleeve and positioned in a first annular groove of the first and second waveguides, so as to block the first and second waveguides in terms of translation along the first axis.

6 Claims, 4 Drawing Sheets

(56) References Cited

U.S. PATENT DOCUMENTS

| | | |
|---|---|---|
| 9,534,625 B2 | 1/2017 | Balsells |
| 2018/0076585 A1* | 3/2018 | Harris, III et al. .. H01R 25/162 |
| 2019/0044205 A1* | 2/2019 | Harper et al. ........ H01P 11/002 |

* cited by examiner

ASSEMBLY COMPRISING A SLEEVE CONNECTING FIRST AND SECOND HOLLOW WAVEGUIDES, WHEREIN GROOVES FOR RECEIVING REVERSIBLE DEFORMABLE ELEMENTS THEREIN ARE LOCATED WAVEGUIDES AND SLEEVE

CROSS-REFERENCE TO RELATED APPLICATIONS

This application claims priority to foreign French patent application No. FR 1906651, filed on Jun. 20, 2019, the disclosure of which is incorporated by reference in its entirety.

FIELD OF THE INVENTION

The present invention relates to an assembly device for assembling two waveguides. The invention applies to the field of satellites and space equipment, but can also be applied to ground products, such as those products used on earth.

BACKGROUND

A hollow waveguide is generally made up of rectilinear portions, but may more generally be of any shape, which need to be connected to one another or to equipment. For example, in the field of space applications, a hollow waveguide may be connected to a payload equipment of a satellite in order to provide radio frequency (RF) links. Waveguides allow propagation of high frequencies up to 50 GHz, with low losses and good adaptation to interfaces, and high shielding efficiency (referred to as "electromagnetic compatibility", also abbreviated to EMC).

The invention applies to hollow waveguides used to guide and to confine electromagnetic waves within a hollow cavity of the hollow waveguides. The hollow waveguides have walls to facilitate multiple reflections of the electromagnetic waves off of the walls of the waveguide. The invention applies more particularly to waveguides used for guiding radiofrequency waves. In other words, the waveguides are intended to be joined together via their respective adjacent ends. The waveguides are placed side by side so that the ends are contiguous. The invention applies to waveguides which may be of rectangular, elliptical or circular section.

Generally, the ends of the waveguides are provided with flanges. The flanges conventionally comprise holes facing each other. The waveguides are then assembled so that the holes are aligned and then screw-nut type systems enter these aligned holes to secure the sections. Four to ten screws are usually provided for assembling and keeping aligned the waveguides. On multi-spot complex payloads, but also on standard VHTSs (abbreviation of the acronym "Very High Throughput Satellites"), there are thousands of waveguides to be assembled. This represents for example more than 60,000 screws on a VHTS. Now, in addition to the time spent on fitting the screws in the aligned holes, the screws and washers represent a very significant cost.

Existing solutions propose retaining-clip systems on the existing flanges. Such solutions are not completely satisfactory because of problems of mass and accessibility of the assembly. Other solutions by welding or bonding the flanges pose a problem of ability to dismantle, and of complexity of implementation.

U.S. Pat. Nos. 7,955,145, 9,267,526, 7,722,415, 8,167,285, 9,534,625 disclose solutions for connecting two elongate members but are not concerned with waveguides subjected to the additional requirements of RF performance and EMC insulation.

SUMMARY OF THE INVENTION

The invention seeks to overcome all or some of the problems mentioned above by providing a device for assembling two waveguides without using screws and capable of ensuring the RF, EMC and mechanical performance and that meets the requirements of resistance to the vibratory environment and ability to withstand knocks due to a vibratory environment, ability to dismantle, and accessibility.

To this end, one subject of the invention is an assembly comprising a first waveguide and a second waveguide extending longitudinally along a first axis, each waveguide having an end and each waveguide comprising a first annular groove, the two ends being contiguous along the first axis Z, and an assembly device for assembling the first waveguide and the second waveguide, wherein the assembly device comprises:

a sleeve surrounding the ends of the first and second waveguides and having an inner wall comprising two first annular grooves facing the first annular grooves of the first and second waveguides, two reversibly deformable elements, each being positioned in a first annular groove of the sleeve and positioned in a first annular groove of the first and second waveguides, so as to block, deter, or prevent the first and second waveguides from translating along the first axis.

According to one embodiment of the invention, the ends of the first and second waveguides are of elliptical section.

According to another embodiment of the invention, the ends of the first and second waveguides are of circular section.

Advantageously, the at least one reversibly deformable element is a canted coil spring, so as to exert a predefined pressure between the first and second waveguides the one on the other.

Advantageously, with at least one of the two ends further comprising at least one second annular groove, the inner wall of the sleeve comprises at least one second annular groove facing the at least one second annular groove of the first and second waveguides, and at least one second reversibly deformable element positioned in the at least one second annular groove of the sleeve and positioned in a second annular groove of the first and/or second waveguides.

The invention also relates to a satellite comprising at least one such assembly.

BRIEF DESCRIPTION OF THE DRAWINGS

The invention will be better understood, and other advantages will become apparent on reading the detailed description of an embodiment given by way of example, which description is illustrated by the attached drawing in which.

For the sake of clarity, the same elements will bear the same references in the different figures.

DETAILED DESCRIPTION OF THE INVENTION

Figure 1:
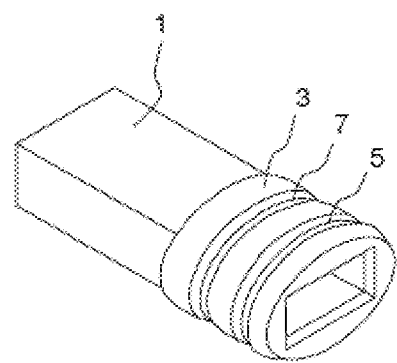
FIG. 1 depicts a waveguide suited to being assembled using the assembly device according to the invention.

FIG. 1 depicts a first waveguide 1, suited to being assembled using the assembly device according to the invention. The first waveguide 1 extends longitudinally along a first axis Z and has an end 3. The end 3 of the first waveguide 1 comprises a first annular groove 5. The end 3 may comprise a second annular groove 7.

The first waveguide 1 depicted in FIG. 1 has two annular grooves 5 and 7 at its end 3. The end 3 needs to have a minimum of one, and preferably has two, but it may also have more than 2.

Figure 2:
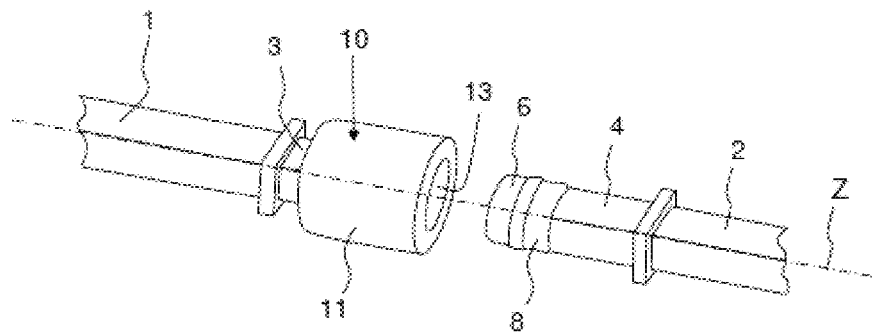
FIG. 2 depicts a first embodiment of the assembly device according to the invention.

FIG. 2 depicts a first embodiment of the assembly device 10 according to the invention. FIG. 2 depicts the first waveguide 1 described previously in FIG. 1 and a second waveguide 2 also extending longitudinally along the first axis Z, and having an end 4 comprising a first annular groove 6. Just like the first waveguide 1, the second waveguide has two annular grooves 6 and 8 at its end 4. The end 4 needs to have a minimum of one, and preferably has two, but the end 4 may also have more than 2. The annular grooves depicted extend annularly (around the ends 3, 4 in the case of the grooves 5, 6, 7, 8, and inside the inner wall 12 of the sleeve 11 in the case of the grooves 13) in a plane substantially perpendicular to the first axis Z. However, the invention similarly applies to the case of grooves extending annularly in a plane secant with the first axis Z, not necessarily perpendicular to the first axis Z.

In order for the first and second waveguides 1, 2 to be assembled, the two ends 3, 4 are contiguous along the first axis Z, as can be seen in FIG. 2.

According to the invention, the assembly device 10 comprises a sleeve 11 surrounding the ends 3, 4 of the first and second waveguides 1, 2. The sleeve has an inner wall 12 comprising two first annular grooves 13 intended, in the assembled position, to be opposite the first annular grooves 5, 6 of the first and second waveguides 1, 2. The assembly device 10 comprises two reversibly deformable elements 14, each positioned in a first annular groove 13 of the sleeve 11 and configured to be positioned in a first annular groove 5, 6 of the first and second waveguides 1, 2, so as to block, deter, or stop the first and second elements from translating along the first axis Z.

In other words, the two reversibly deformable elements 14 are configured to cooperate with the first grooves 5, 6 of the first and second waveguides 1, 2 and with the first grooves 13 of the sleeve 11 which envelops the two ends 3, 4 of the first and second waveguides 1, 2.

In order to assemble the two waveguides 1, 2, the assembly device is inserted at one end, for example the end 3. The end 4 of the waveguide 2 is brought closer to the end 3 of the waveguide 1, and thus to the assembly device 10. This end 4 is then inserted into the sleeve 11 of the assembly device 10. The reversibly deformable element 14 intended to be positioned in the first groove 6 of the end 4, under the force exerted by the end 4 during its insertion into the sleeve 11, retracts into the first groove 13 of the sleeve 11, which groove is associated therewith. When the end 4 is in position, that is to say in abutment against the end 3 in the sleeve 11, the reversibly deformable element 14 is released, such as unbiased or recovers a shape, in the groove 6 of the end 4 and resumes an initial shape. Thus, the reversibly deformable element 14 exerts pressure on the grooves 6, 13 with which the reversibly deformable element 14 cooperates. The same thing occurs with the reversibly deformable element 14 associated with the grooves 5, 13 at the end 3 of the first waveguide 1.

In one advantageous embodiment, a pressure exerted by the reversibly deformable elements 14 at the grooves of the first and second waveguides 1, 2 is from the first waveguide 1 to the second waveguide 2 and from the second waveguide 2 to the first waveguide 1. This pressure exerted by the waveguides 1, 2 on one another ensures the tightness of the seal between the waveguides 1, 2.

The resulting sealing is mechanical and also ensures good EMC insulation.

Thus, the expected gains with waveguide assembly devices according to the invention are multiple. It is no longer necessary to purchase screws and washers for assembly. This results in a cost saving. Because the assembly device does not use screws, a saving in mass, of the order of 30%, is achieved. Finally, the invention allows a reduction in assembly time, and better accessibility. It is possible to have a higher waveguide density. Furthermore, the invention also applies to existing waveguides. The invention also makes it possible to ensure uniform contact pressure over the entire periphery of the two assembled waveguides and to have a reinforced shielding system with the metal sleeve covering the join, this zone being sensitive to potential EMC leakages. The invention ensures the quality of the assembly while minimizing the number of parts that need to be assembled. Finally, the invention also makes it possible to envisage multiple flanged assemblies.

Figure 3:
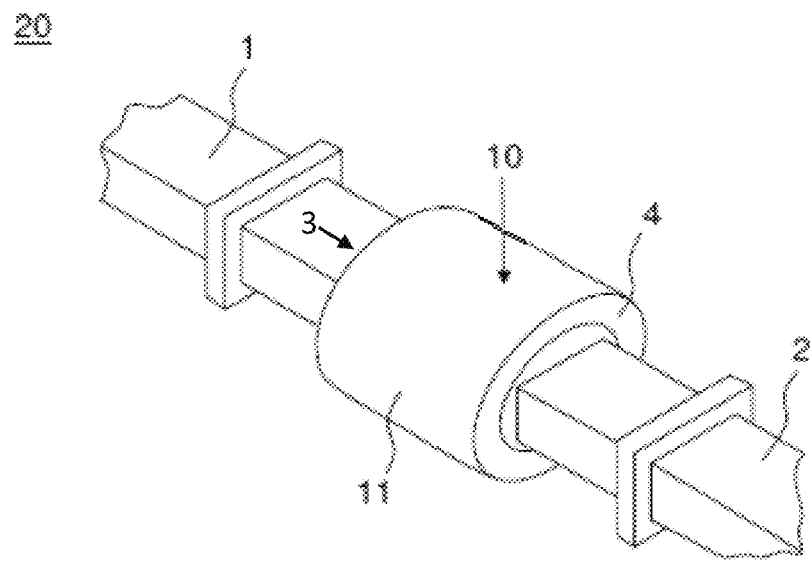
FIG. 3 depicts the first embodiment of the assembly according to the invention with the two elements assembled.

FIG. 3 depicts the first embodiment of the assembly 20 according to the invention with the two waveguides 1, 2 assembled. In the examples depicted, the ends 3, 4 of the first and second waveguides 1, 2 are of elliptical section. Although an elliptical section is preferred, the ends 3, 4 may also be of circular section. In the case of application to waveguides, these being of rectangular section, the elliptical section of the ends is preferred in order to generate constant pressure on the periphery of the end by the reversibly deformable element while exercising caution with regard to mass (i.e. by adding a minimum of material at the ends).

The invention relates to an assembly 20 comprising a first waveguide 1 and a second waveguide 2 extending longitudinally along the first axis Z, each having an end 3, 4, each comprising a first annular groove 5, 6, the two ends 3, 4 being contiguous along the first axis Z, the assembly comprising at least one assembly device 10 as described in FIGS. 1-2 of this disclosure.

Figure 4:
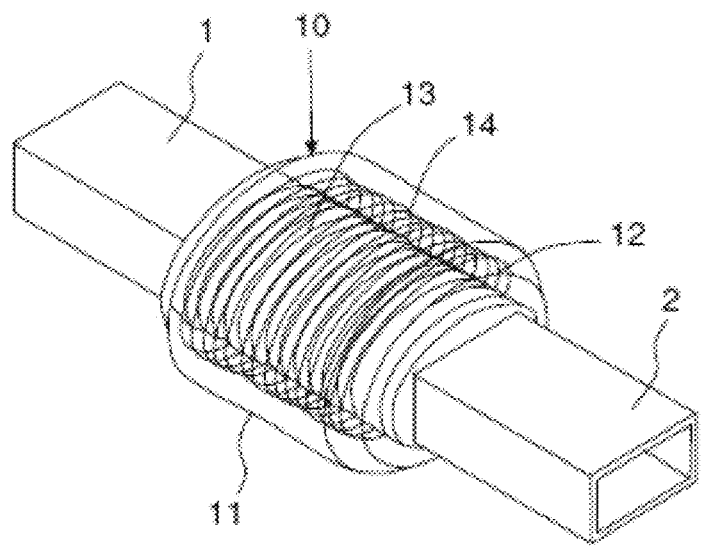
FIG. 4 depicts the assembly according to the invention.

Each of FIGS. 3-4 depicts an assembly according to the invention. In FIG. 4, the sleeve 11 of the assembly device 10 is depicted with partial transparency in order to show the inner wall 12 of the grooves 13 and the reversibly deformable elements 14 positioned in the grooves 13 of the sleeve 11 and in the grooves 5, 6 (not visible) of the assembled waveguides 1, 2.

Figure 5:
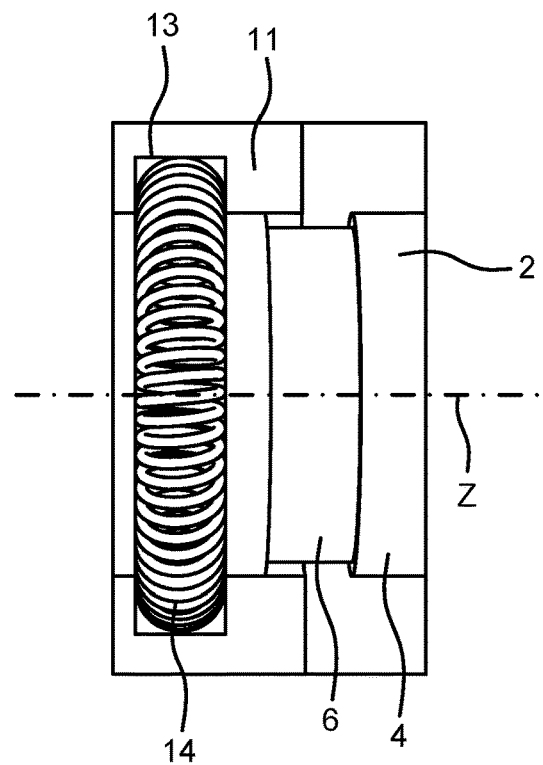
FIG. 5 partially depicts the assembly device according to the invention, before assembly of the waveguides.

FIG. 5 partially depicts the assembly device according to the invention, before the assembling of the waveguides 1, 2. In FIG. 5, only the waveguide 2 is depicted, at the moment at which the end of the waveguide 2 is inserted into the sleeve 11. The sleeve 11 comprises the first groove 13 in which the reversibly deformable element 14 is positioned. The reversibly deformable element 14 is a canted coil spring. As explained later, this particularly advantageous embodiment makes it possible, in addition to blocking the translational movement of the two waveguides along the first axis Z, to exert a predefined pressure from one waveguide to the other. When the end 4 is being inserted into the sleeve 11, the canted coil spring 14 is deformed, it is compressed into the groove 13 of the sleeve 11 to allow insertion of the end 4.

Figure 6:
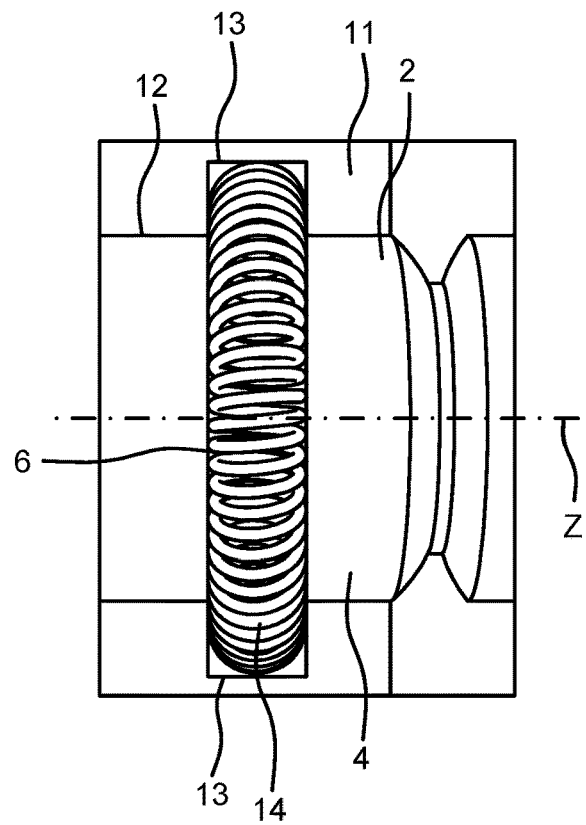
FIG. 6 partially depicts the assembly device according to the invention, with the waveguides assembled.

FIG. 6 partially depicts the assembly device according to the invention, with the waveguides 1, 2 assembled. This figure is to be considered in the continuity of the insertion of the waveguide 2 into the sleeve 11 previously described. In this figure, the end 4 has been inserted a little further into the sleeve 11, until the first groove 6 of the waveguide 2 is facing the groove 13 of the sleeve 11. The canted coil spring 14 can then be released in the groove 6 of the waveguide 2. It is then positioned both in the groove 6 of the waveguide and in the groove 13 of the sleeve 11. This results in the final position of assembly of the waveguide 2 in the sleeve 11. The waveguide 2 is blocked in terms of translation along the first axis Z. In a symmetrical manner, the waveguide 1 is also in final position of assembly in the sleeve 11. The waveguide 1 is blocked in terms of translation along the first axis Z. Furthermore, the inclination of the coils of the spring 14 in the groove 6 of the waveguide 2 generates a force directed towards the waveguide. 1. Likewise, the inclination of the coils of the spring 14 in the groove 5 of the waveguide 1 generates a force directed towards the waveguide 2. The springs 14 generate a pressure of one waveguide towards the other waveguide, which makes it possible to ensure the level of insulation to be respected between the two assembled waveguides (EMC insulation and mechanical seal).

In the embodiments described above, and for reasons of ease of understanding, only one groove per waveguide end was considered, and two grooves in the sleeve (a groove in the sleeve being associated with a groove in a waveguide). The same principle applies with several other grooves, preferably two grooves per end of the waveguide and therefore four grooves in the sleeve, in order to generate a good level of pressure between the waveguides (the number of reversibly deformable elements being advantageously equal to that of the number of grooves in the sleeve, but potentially also being lower, provided that the minimum of two—one element per waveguide—is respected).

More generally, at least one of the two ends 3, 4 may further comprise at least one second annular groove 7, 8, and the inner wall 12 of the sleeve 11 may then comprise at least one second annular groove intended to be facing the at least one second annular groove 7, 8 of the first and second waveguides 1, 2, and at least one second reversibly deformable element positioned in the at least one second annular groove of the sleeve and configured to be positioned in a second annular groove 7, 8 of the first and/or second waveguides 1, 2.

Figure 7:
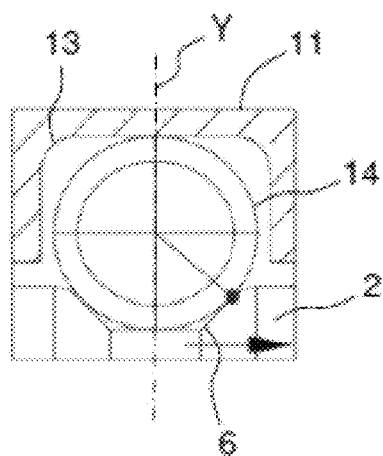
FIG. 7 depicts a view in section perpendicular to the axis Z at the level of the grooves of the assembly device in a symmetrical design according to the invention, with the waveguides assembled.

FIG. 7 depicts a view in section perpendicular to the axis Z at the level of the grooves 13 of the assembly device 10 in a symmetrical design according to the invention, with the waveguides 1, 2 assembled. For example, let Y be a second axis perpendicular to the first axis Z and passing through the grooves 13 and 6. In the sectional view of FIG. 7, the coil of the canted coil spring is circular. The associated grooves 13, 6 of the sleeve and the waveguide 2 are symmetrical with respect to the second axis Y. In this symmetrical configuration, the insertion force to be applied for assembly is equal to the extraction force to be applied in order to disassemble the waveguides.

Figure 8:
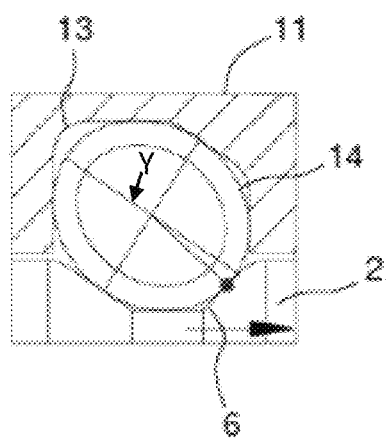
FIG. 8 depicts a view in section perpendicular to the axis Z at the level of the grooves of the assembly device in an asymmetrical design according to the invention, with the waveguides assembled.

FIG. 8 depicts a view in section perpendicular to the axis Z at the level of the grooves of the assembly device in an asymmetrical design according to the invention, with the waveguides assembled. In the sectional view of FIG. 8, the coil of the canted coil spring is elliptical. The associated grooves 13, 6 of the sleeve and of the waveguide 2 are asymmetrical with respect to the second axis Y. In this asymmetrical configuration, the insertion force to be applied for assembly is different from the extraction force to be applied in order to disassemble the waveguides. Advantageously, the extraction force is greater than the insertion force. According to the assembly of waveguides to be carried out, a pressure of one waveguide on the other waveguide is defined in advance. Depending on this pressure, the canted coil spring is made with previously-defined parameters in order to meet the desired requirement in terms of the pressure to exert: degree of inclination of the coils, diameter of the coils, shape and dimensions of the section of the coils. Once the spring has been designed, the grooves of the ends of the waveguides and of the sleeve are designed to accept the spring. Thus, depending on the type of spring and grooves (shape, depth), the magnitude of the assembly and disassembly force can be parameterized. The pressure between the two waveguides is applied through the springs applying their force through the sized grooves. The insertion and extraction forces can be up to 250 N depending on the design of the grooves and of the springs.

The use of canted coil springs allows more stable control over the forces applied, and the specific nature of the asymmetrical design according to the shape of the groove allows an insertion force that is low in comparison with the extraction force, for example differing by a factor of 10.

The sleeve 11 may be made of any material for common use. In the case of application to waveguides, the sleeve 11 is metallic, preferably made of aluminum. This is because, in use, waveguides are subjected to high temperature gradients, for example between −180° C. and +180° C. With a sleeve 11 made of aluminum like the waveguides, the expansion of materials is better controlled.

The springs can be made of stainless steel with a surface treatment of the silvering type. In addition to the uniform contact pressure they provide at the periphery of the waveguides 1, 2, the springs give very good EMC results. Springs made of copper can also be used.

The reversibly deformable elements 14 perform the role of blocking the waveguides 1, 2 in terms of translational movement along the first axis Z.

Figure 9:
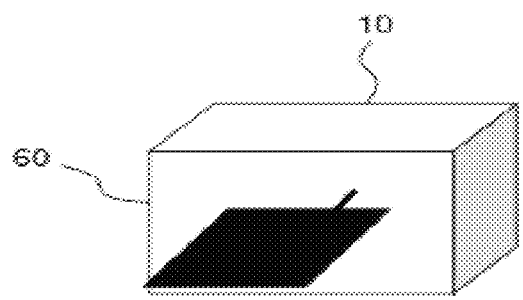
FIG. 9 depicts a satellite equipped with at least one assembly device according to the invention.

FIG. 9 depicts a satellite 60 equipped with at least one assembly 20 according to the invention having an assembly device 10.

The invention claimed is:

1. An assembly comprising a first hollow waveguide and a second hollow waveguide extending longitudinally along a first axis (Z), each of the first and second hollow waveguides having a respective end to define two ends, the two ends being contiguous along the first axis (Z), and an assembly device for assembling the first waveguide and the second waveguide, wherein the assembly device further comprises:

a first annular groove on the first hollow waveguide and a first annular groove on the second hollow waveguide, a sleeve surrounding the two ends of the first and second hollow waveguides, the sleeve having an inner wall comprising two first annular grooves facing the first annular grooves of the first and second hollow waveguides, a first reversibly deformable element being positioned in a first of the two first annular grooves of the sleeve and positioned in the first annular groove on the first hollow waveguide, and a second reversibly deformable element being positioned in a second of the two first annular grooves of the sleeve and positioned in the first annular groove on the second hollow waveguide, so as to block the first and second hollow waveguides in terms of translation along the first axis (Z).

2. The assembly according to claim 1, wherein the two ends of the first and second hollow waveguides are of elliptical section.

3. The assembly according to claim 1, wherein the two ends of the first and second hollow waveguides are of circular section.

4. The assembly according to claim 2, wherein at least one of the first and second reversibly deformable elements is a canted coil spring, so as to exert a predefined pressure between the first and second hollow waveguides.

5. The assembly according to claim 1, at least one of the two ends of the first and second hollow waveguides further comprising at least one second annular groove, wherein the inner wall of the sleeve comprises at least one second annular groove facing the at least one second annular groove of the at least one of the two ends, and at least one second reversibly deformable element positioned in the at least one second annular groove of the sleeve and positioned in the at least one second annular groove of the at least one of the two ends.

6. A satellite comprising at least one assembly according to claim 1.

* * * * *